US008214987B1

(12) United States Patent
Brock et al.

(10) Patent No.: US 8,214,987 B1
(45) Date of Patent: Jul. 10, 2012

(54) REMOTE VACUUM OR PRESSURE SEALING DEVICE AND METHOD FOR CRITICAL ISOLATED SYSTEMS

(75) Inventors: James David Brock, Newport News, VA (US); Christopher D. Keith, Newport News, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 939 days.

(21) Appl. No.: 12/287,798

(22) Filed: Oct. 14, 2008

(51) Int. Cl.
*B23P 19/04* (2006.01)
*B25B 27/14* (2006.01)
*H02G 1/08* (2006.01)
*B65H 59/00* (2006.01)
*E21C 29/16* (2006.01)

(52) U.S. Cl. ................ 29/255; 29/264; 29/271; 29/278; 254/134.3 FT; 254/134.4

(58) Field of Classification Search .................... 29/255, 29/264, 263, 278, 271; 254/134.3 FT, 134.4
See application file for complete search history.

(56) References Cited

U.S. PATENT DOCUMENTS 1,177,843 A * 4/1916 Ackerman et al. ....... 29/243.519
2,380,068 A * 7/1945 Patton ............................ 29/255
2,870,629 A * 1/1959 Willis ............................... 73/86
3,139,677 A * 7/1964 Goldstein ....................... 29/451
3,479,728 A * 11/1969 Micai et al. ..................... 29/450
3,529,497 A * 9/1970 Brooks ........................... 81/463
4,026,003 A * 5/1977 Leone et al. ........... 425/436 RM
4,138,778 A * 2/1979 Marzoli .......................... 29/235
4,177,546 A * 12/1979 Geisinger ....................... 29/235
4,711,011 A * 12/1987 Nugier ............................ 29/239
5,004,248 A 4/1991 Messenger et al.
5,072,500 A * 12/1991 Wagner ........................... 29/234
5,090,102 A * 2/1992 Lovell ............................. 29/255
5,299,347 A * 4/1994 Decker ........................... 29/235
5,301,409 A * 4/1994 Laframboise ................... 29/275
5,341,559 A * 8/1994 Reid et al. ....................... 29/523
5,718,032 A * 2/1998 Schneider ....................... 29/450
5,909,909 A * 6/1999 Glauber .......................... 29/235
6,038,961 A 3/2000 Filippi et al.
6,312,018 B1 * 11/2001 Martin ............................ 285/39
6,571,447 B1 * 6/2003 Martin ............................ 29/235
6,676,168 B2 * 1/2004 McAliley ...................... 285/206
6,732,425 B2 * 5/2004 Schafer ........................... 29/727
7,260,942 B2 8/2007 Shteinberg et al.
7,412,893 B2 8/2008 Hedtke
8,099,847 B2 * 1/2012 Hahn et al. ...................... 29/252

* cited by examiner

*Primary Examiner* — Lee D Wilson
*Assistant Examiner* — Alvin Grant

(57) ABSTRACT

A remote vacuum or pressure sealing apparatus and method for making a radiation tolerant, remotely prepared seal that maintains a vacuum or pressure tight seal throughout a wide temperature range. The remote sealing apparatus includes a fixed threaded sealing surface on an isolated system, a gasket, and an insert consisting of a plug with a protruding sample holder. An insert coupling device, provided for inserting samples within the isolated system, includes a threaded fastener for cooperating with the fixed threaded sealing surface on the isolated system. The insert coupling device includes a locating pin for azimuthal orientation, coupling pins, a tooted coaxial socket wrench, and an insert coupling actuator for actuating the coupling pins. The remote aspect of the sealing apparatus maintains the isolation of the system from the user's environment, safely preserving the user and the system from detrimental effect from each respectively.

12 Claims, 4 Drawing Sheets

42 66 22 28 2 20 30 32 46 44 82 34 48 36 He 24 2 84 86 26 36 38

REMOTE VACUUM OR PRESSURE SEALING DEVICE AND METHOD FOR CRITICAL ISOLATED SYSTEMS

The United States of America may have certain rights to this invention under Management and Operating contract No. DE-AC05-06OR23177 from the Department of Energy.

FIELD OF THE INVENTION

This invention relates to achieving a vacuum or pressure tight seal on an isolated system and more particularly to a device and method for making a radiation tolerant, remotely prepared seal that maintains a vacuum or pressure tight seal.

BACKGROUND OF THE INVENTION

In particle accelerators, nuclear power plants, chemical plants and the like, it is sometimes necessary to introduce a material into a hazardous or controlled environment remotely to insure the protection of personnel from the hazardous environment. A controlled environment could include sealed areas that are under vacuum or pressure or which contain hazardous materials such as chemicals or radioactive substances.

At the Jefferson National Lab, for example, in the electron beam line, the electron beam is typically maintained in a high vacuum and at ultra-low temperature to maintain a superconducting operation. The high vacuum in the beam line is typically maintained at below $1\times10-^{9}$ Torr. Some portions of the beam line are cooled with liquefied helium that has been chilled to 456 degrees below zero Fahrenheit, nearly Absolute Zero, to keep the acceleration cavities cold.

In order to carry out electron-proton scattering experiments, materials are often inserted directly into the path of the relativistic particles in the electron beam. As a result of the radiation exposure, inserting the target material is a dangerous task that requires much care on the part of technicians and exposes them to great risk.

Therefore, what is needed is a device and method that can be operated remotely to seal a critical isolated system that is under vacuum or pressure. The vacuum or pressure sealing device should be capable of being operated remotely in order to maintain the isolation of the system and protect personnel from exposure to hazardous materials such as chemicals, cryogenics, and radioactivity.

SUMMARY OF THE INVENTION

The present invention is a remote vacuum or pressure sealing apparatus and method for sealing a critical isolated system. The remote sealing apparatus includes a fixed threaded sealing surface on an isolated system, a gasket, and an insert consisting of a plug with a protruding sample holder. An insert coupling device, provided for inserting samples within the isolated system, includes a threaded fastener for cooperating with the fixed threaded sealing surface on the isolated system. The insert coupling device includes a locating pin for azimuthal orientation, coupling pins, a toothed coaxial socket wrench, and an insert coupling actuator for actuating the coupling pins. An insertion tool is provided for maintaining the orientation of the insert as well as limiting contact or exposure between the user and the isolated system as the seal is made vacuum or pressure tight.

OBJECTS AND ADVANTAGES

Several advantages are achieved with the remote vacuum or pressure sealing apparatus and method of the present invention, including:

(1) The sealing apparatus and method enable remote insertion of samples within an isolated system thereby reducing the potential danger to personnel.

(2) A vacuum or pressure tight seal is providing with the remote sealing apparatus, thereby minimizing the effect of the environment on the isolated system.

(3) An insertion tool portion of the sealing apparatus maintains orientation of the insert and limits exposure of the user to the isolated system.

(4) The sealing method utilizes bearings constructed of a metal dissimilar to that of the isolated system, thereby enabling the pressure on the sealed system to increase as the temperature decreases.

(5) The sealing apparatus maintains a pressure or vacuum tight seal throughout a wide temperature range including 300K-35 mK including temperature cycling within the range.

(6) The sealing apparatus preserves the orientation of the sealing surface with respect to the mating surface, which can be vital for the operation of delicate instrumentation or samples.

(7) The remote aspect of the sealing apparatus maintains the isolation of the system from the user's environment, safely preserving the user and the system from detrimental effect from each respectively (e.g. radiation, extreme temperature, contamination, etc.).

These and other objects and advantages of the present invention will be better understood by reading the following description along with reference to the drawings.

Figure 1:
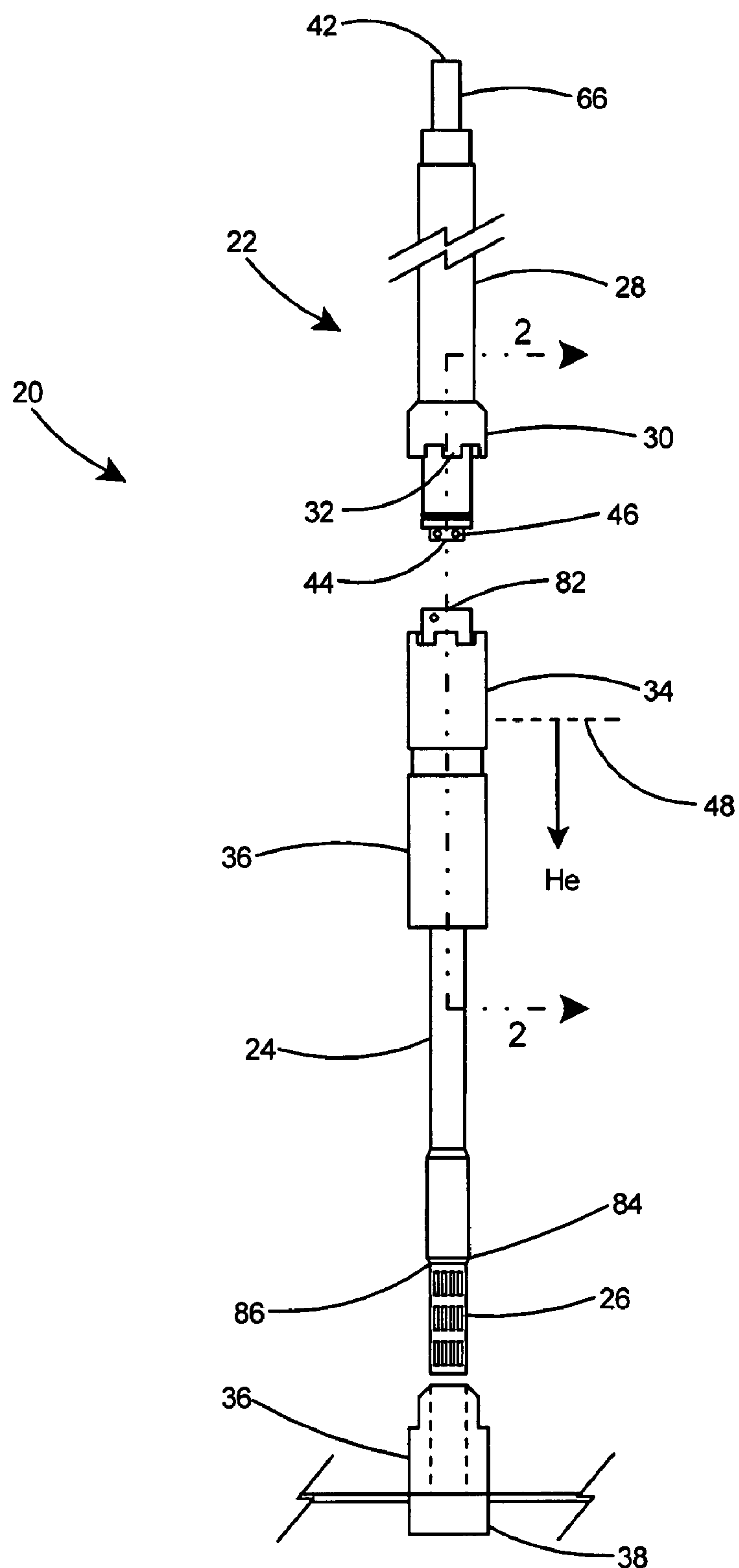
FIG. 1 is a side view of a remote vacuum or pressure sealing apparatus according to the present invention and a portion of an isolated system.

| INDEX TO REFERENCE NUMERALS IN DRAWINGS | |
|---|---|
| 20 | remote vacuum or pressure sealing apparatus |
| 22 | tubular insertion and coupling tool |
| 24 | tubular insert or target stick |
| 26 | target cup |
| 28 | outer wrench shaft of insertion tool |
| 30 | toothed coaxial socket wrench |
| 32 | teeth |
| 34 | internally threaded fastener |
| 36 | mounted fixed seal |
| 38 | isolated system |
| 40 | inner capture shaft |
| 42 | remote end of inner capture shaft |
| 44 | inner end of inner capture shaft |
| 46 | coupling pin |
| 48 | threaded section |
| 50 | internal threads |
| 52 | gasket |
| 54 | insert including plug and sample holder |
| 56 | bearing race |
| 58 | thrust bearing |
| 60 | first sealing surface |
| 62 | second tapered sealing surface |

-continued

| INDEX TO REFERENCE NUMERALS IN DRAWINGS | |
|---|---|
| 64 | insert coupling device |
| 66 | insert coupling actuator |
| 68 | bore in target stick |
| 70 | indium seal |
| 72 | rack and pinion arrangement |
| 74 | pinion gear |
| 76 | rack |
| 78 | direction of rotation |
| 80 | directional arrow |
| 82 | outer end of target stick |
| 84 | inner end of target stick |
| 86 | aluminum beam window |
| 88 | locating pin |

DETAILED DESCRIPTION OF THE INVENTION

With reference to FIG. 1, the present invention comprises a remote vacuum or pressure sealing system for critical isolated systems. Although the remote sealing device of the present invention has utility for sealing isolated systems under both vacuum and pressure, hereinafter the description of the invention will be in terms of a vacuum sealing system.

As shown in FIG. 1, a preferred embodiment of the remote sealing system 20 includes an elongated tubular insertion and coupling tool 22 and a tubular target stick 24 with a target cup 26. The insertion and coupling tool 22 includes an outer wrench shaft 28 and a toothed coaxial socket wrench 30 integral with the lower portion of the outer wrench shaft 28. The socket wrench 30 includes one or more teeth 32 for engaging an internally threaded fastener 34 that will be threaded upon an externally threaded mounted fixed seal 36 that forms a portion of an isolated system 38. The isolated system 38 is typically maintained at a vacuum of approximately $1\times10^{-9}$ Torr and at temperature of approximately 4 Kelvin. An inner capture shaft 40 having a remote end 42 and an inner end 44 extends through the outer wrench shaft 28 of the tubular insertion and coupling tool 22. Coupling pins 46 are provided at the inner end 44 of the inner capture shaft 40. Note that the elongated tubular insertion and coupling tool 22 can be constructed of various lengths to provide adequate protection to a user.

Figure 2:
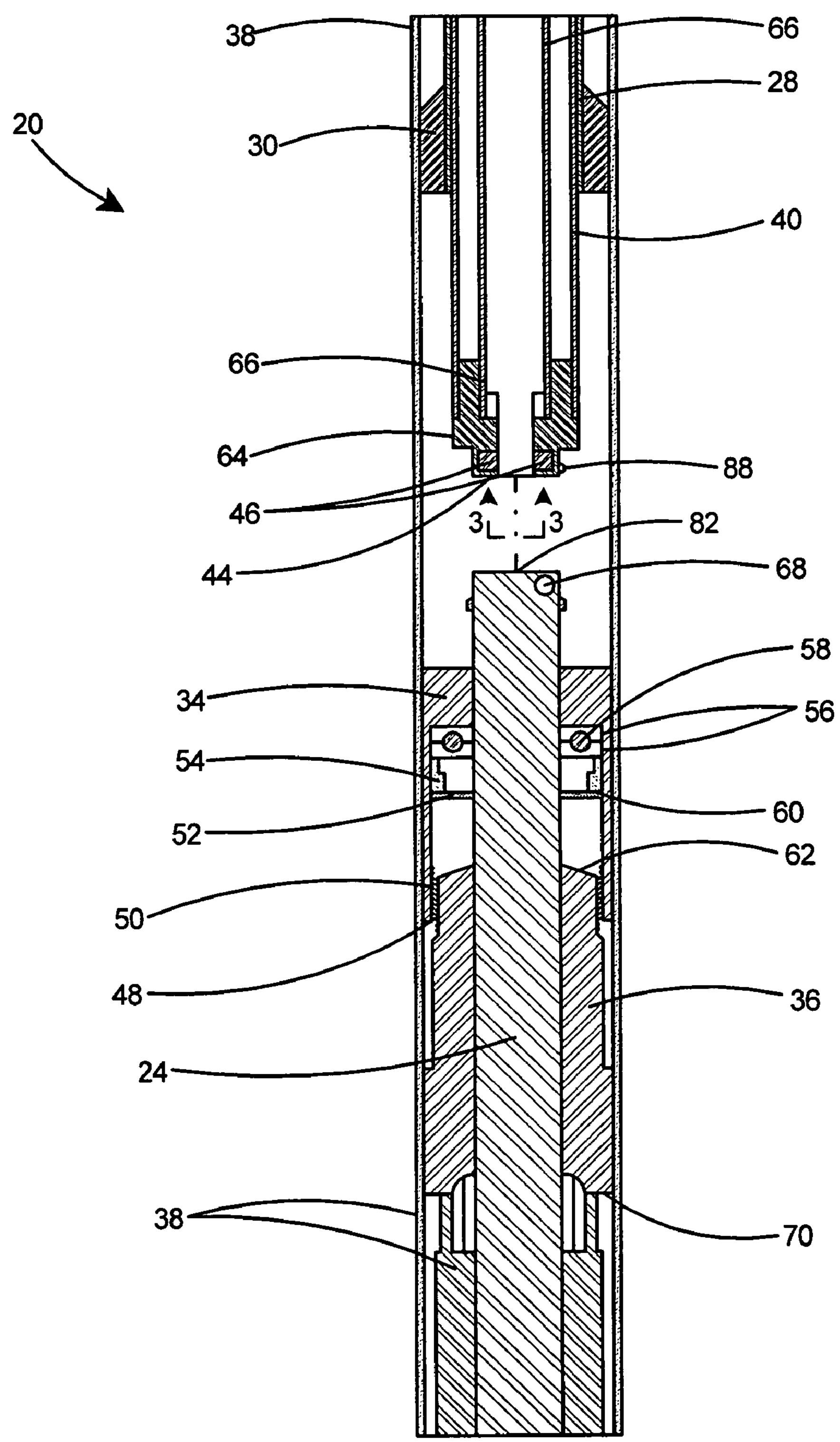
FIG. 2 is a sectional view of the remote vacuum or pressure sealing apparatus taken along line 2-2 of FIG. 1.

As shown in FIG. 2, the top end of the mounted fixed seal 36 includes a threaded section 48 thereon. Threaded fastener 34 includes internal threads 50 for engaging the threaded section 48 of the mounted fixed seal 36. Surrounding target stick 24 there is provided a gasket 52, an insert 54, bearing races 56, and a titanium thrust bearing 58. A first sealing surface 60 is provided above and a second tapered sealing surface 62 is provided below the gasket 52. The tubular insertion and coupling tool 22 includes an insert coupling device 64 with a locating pin 88 for azimuthal orientation of the target stick during seal commissioning and an insert coupling actuator 66. Bores 68 are provided in the top portion of the target stick 24 and an indium seal 70 is provided between the lower surface of the mounted fixed seal 36 and the isolated system 38.

The remote sealing system 20 provides an apparatus and method for sealing a critical isolated system. As shown in FIG. 2, the tubular insertion and coupling tool 22 can be used to couple to the target stick 24 and insert or remove the target stick 24 from the isolated system 38. The insertion and coupling tool 22 is used to maintain orientation of the target stick 24 as well as limiting contact and exposure between the user and intended isolated system 38 as the seal is made vacuum tight, thus minimizing the effect of the environment on the isolated system. The sealing method of the present invention employs dissimilar metals, specifically bearing races 56 and a thrust bearing 58 that are constructed of a metal with a lower thermal contraction rate than that of the metal portions of the isolated system 38. Typically, the metal portions of the isolated system 38 are constructed of stainless steel. Therefore the thrust bearing 58 and bearing races 56 are preferably constructed of a metal that includes a lower thermal contraction rate than the stainless steel. In the preferred embodiment, the thrust bearing 58 and bearing races 56 are constructed of titanium.

Figure 3:
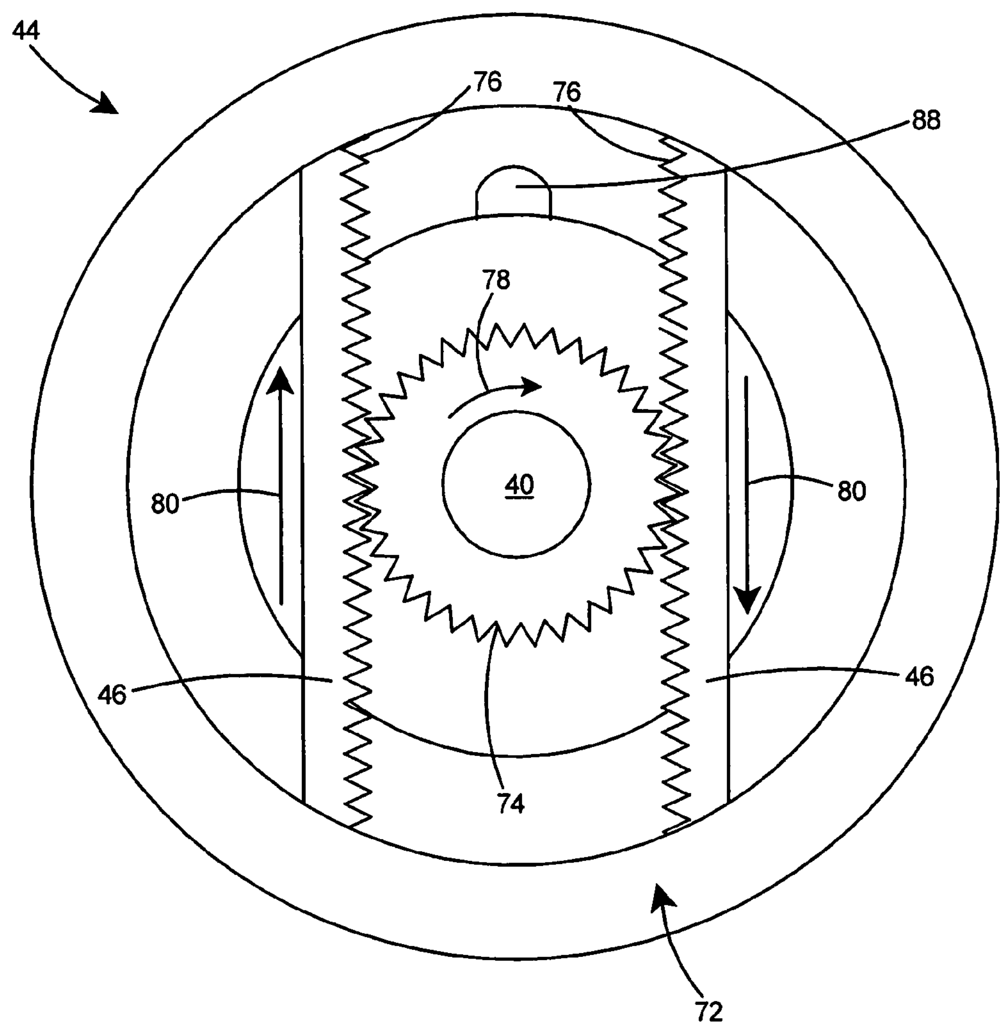
FIG. 3 is a view of the remote vacuum or pressure sealing apparatus taken along line 3-3 of FIG. 2 showing in detail the rack and pinion arrangement on the inner end of the insertion and coupling tool.

Referring to FIG. 3, the inner end 44 of the capture shaft 40 includes a rack and pinion arrangement 72 for coupling and uncoupling the insertion tool 22 to the target stick (not shown). A pinion gear 74 is provided on the end of capture shaft 40 and a rack 76 is provided on the inner sides of each coupling pin 46. Rotation of pinion gear 74 in the direction of rotation, shown by directional arrow 78, moves each coupling pin 46 in the direction of arrow 80. Thus, rotation of pinion gear 74 via the insert coupling actuator 66, in a first direction drives the coupling pins 46 outward with respect to the capture shaft 40 thereby causing coupling pins 46 to extend through bores 68 in target stick (not shown) and thereby couple the insertion tool 22 to the target stick. Rotation of insert coupling actuator 66 in the opposite direction will cause the coupling pins 46 to retract through bores 68 and thereby release the target stick.

The remote vacuum or pressure sealing apparatus 20 provides a method of removing or inserting a target material into an isolated or hazardous system remotely, thereby providing protection to the operator. Operation of the sealing apparatus is described herein for removal of a target from an isolated system. With reference to FIG. 2, for removing a target the present invention is operated by retracting the coupling pins 46 and advancing the tubular insertion and coupling tool 22 until the inner end 44 is inserted within the outer end 82 of the target stick 24. The relative orientation between coupling tool 22 and target stick 24 is determined by the azimuthal locating pin 88. Insert coupling actuator 66 is then turned to cause rotation of pinion gear 74 thereby driving the coupling pins 46 to the extended position through the bores 68 in the target stick 24 and thereby locking the coupling tool 22 to the target stick 24. The toothed coaxial socket wrench 30 then descends over and envelops the capture shaft 40 until the teeth 32 of the tooth coaxial socket wrench 30 and the internally threaded fastener 34 engage. The outer wrench shaft 28 is then rotated counterclockwise to loosen the internally threaded fastener 34 from the mounted fixed seal 36 thus eliminating the force on the gasket 52 and breaking the seal. The inner capture shaft 40 is then slowly retracted with the target stick 24 attached and removed from the isolated system 38

Figure 4:
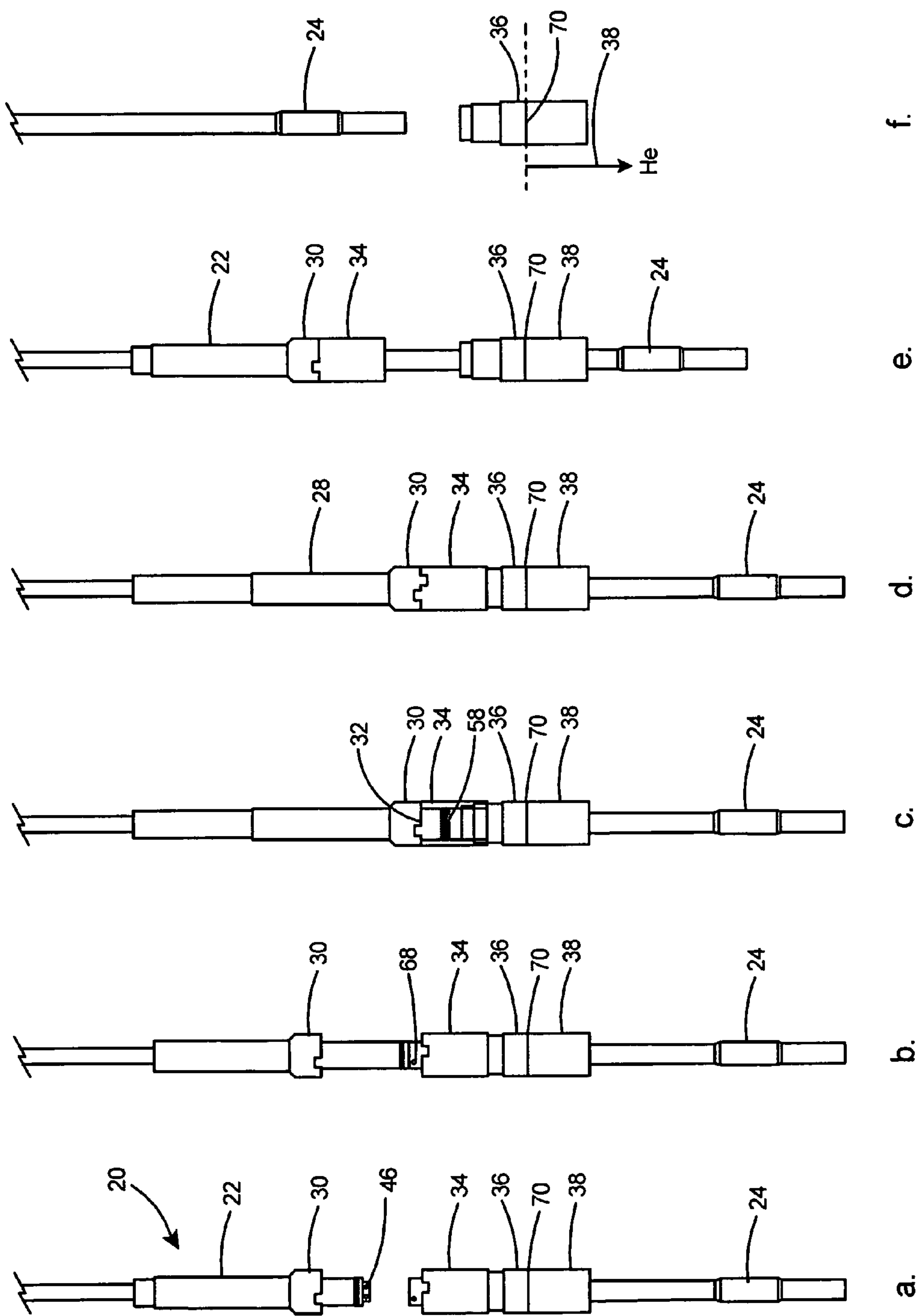
FIG. 4 is a sequence of views of the remote vacuum or pressure sealing apparatus of the present invention in various stages as the target stick is removed from the isolated system.

The various steps described above in the operation of the remote vacuum or pressure sealing apparatus 20 to remove a target from an isolated system are shown in a series of drawings, labeled a through f, in FIG. 4. From left to right in the figure, the steps include a) the tubular insertion and coupling tool 22 with coupling pins 46 is placed in axial alignment with the target stick 24; b) the pins of the coupling tool 22 are extended through bores 68 in target stick 24 to lock the coupling tool 22 to the target stick 24; c) toothed coaxial socket wrench 30 is advanced until the teeth 32 engage the internally threaded fastener 34, at this point internally threaded fastener 34 is interlocked with the mounted fixed seal 36 and the titanium thrust bearing 58 is maintaining a vacuum tight seal as a result of the lesser thermal contraction rate of the titanium as compared to the stainless steel threaded fastener 34; d) outer wrench shaft 28 is turned counterclockwise to loosen the internally threaded fastener 34; e) the inner capture shaft 40 is retracted with the target stick 24; and f) the target stick 24 is pulled out of the mounted fixed seal 36 and the isolated system 38. Insertion of a target stick 24 into the isolated system 38 is essentially reversing the above steps a-f with a new kapton gasket placed over the target stick 24.

With reference to FIG. 2, since the invention takes advantage of the properties of dissimilar metals to create a vacuum-tight seal, the choice of materials is critical to the practice of the present invention. The sealing apparatus has been tested on isolated systems that in a high radiation environment and are maintained at a vacuum of approximately $1\times10^{-9}$ Torr and at temperature ranging from 0.035 up to 300 Kelvin. The major portions of the remote vacuum or pressure sealing apparatus 20 that form the seal, including the internally threaded fastener 34, mounted fixed seal 36, and the target stick 24, are constructed of stainless steel. The thrust bearing 58, and the bearing races 56 if desired, are constructed of a metal that has a lower thermal contraction rate than stainless steel. Preferably the bearing races 56 and thrust bearing 58 are constructed of titanium. The gasket is preferably constructed of crushable materials such as polymers or films including biaxially-oriented polyethylene terephthalate and polyimide, or metals such as copper, aluminum, or indium. Most preferably, the gasket is formed of polyimide. Biaxially-oriented polyethylene terephthalate and polyimide films include trade names MYLAR® and KAPTON® respectively and are available from DuPont Company, Wilimington, Del. Thus, after the target stick 24 has been inserted into the isolated system 38 and the internally threaded fastener 34 torqued to the proper force onto the mounted fixed seal 36 to form the seal, the isolated system is allowed to return to the steady state conditions of approximately $1\times10^{-9}$ Torr and 4 Kelvin. As the internally threaded fastener 34 approaches the temperature of the isolated system 38, the titanium thrust bearing 58 and the bearing races 56 contract at a lesser rate than the surrounding stainless steel portions of the seal. Thus, as the system cools, the titanium thrust bearing 58 and bearing races 56 exert increasing pressure on the seal thereby applying more pressure on the gasket 52 at both the first sealing surface 60 and second sealing surface 62. The taper of the second sealing surface 62 incorporated into the mounted fixed seal 36 adds additional force due to the geometry. An inward radial force occurs as the first sealing surface 60 on the insert plug 54 approaches equilibrium. If the thrust bearing 58 and bearing races 56 were constructed of the same material as the internally threaded fastener 34 and insert 54, or of a material with a higher thermal contraction rate than the stainless steel, the bearing 58 and bearing races 56 would exert less force as the isolated system came to equilibrium, and this would cause an undesirable loss of vacuum.

Although the remote vacuum or pressure sealing apparatus 20 is shown in a vertical orientation throughout the specification and figures herein, it should be emphasized that the sealing apparatus can be used in any orientation. The remote vacuum or pressure sealing apparatus 20 of the present invention has been used extensively in a substantially horizontal orientation in the beam line of a particle accelerator for insertion of targets and forming a vacuum-tight seal therein.

The sealing method of the present invention therefore employs dissimilar metals, in this example titanium bearing races 56 and a titanium thrust bearing 58 to enhance the force on a gasket 52 that is mechanically crushed between two sealing surfaces 60 and 62. The sealing method takes advantage of the differential thermal contraction rates of various components and the geometry of sealing surfaces to compliment the sealing force provided by the threaded coupling of internally threaded fastener 34 to the mounted fixed seal 36.

Additionally, the geometry of the sealing surfaces 60 and 62 work in conjunction with the dissimilar metal providing further assurance of seal integrity throughout the temperature range so long as the temperature of the insert (including sample holder 54, threaded fastener 34, titanium bearing races 56, and titanium thrust bearing 58) is greater than the temperature of the fixed threaded sealing surface 48 when securing the threaded coupling. In an effort to minimize torque required to tighten the threaded coupling, the titanium bearing 58 is a thrust bearing thereby reducing frictional drag forces and seizing due to foreign contamination. The thrust bearing 58 makes the friction of the engaged threads 48 and 50 the dominating frictional force minimizing the torque and reducing the stress on the insertion tool 22.

With reference to FIG. 1, the inner end 84 of target stick 24 includes target cup 26 which holds target particles for use in scattering experiments in the beam line of a particle accelerator. The target particles are typically doped butanol beads which provide a polarized material for scattering experiments. A thin aluminum beam window 86, with a thickness of between 0.007 and 0.010 inch is provided at the end of the target stick.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A remote sealing apparatus for an isolated system comprising:

a tubular insertion and coupling tool including a central capture shaft with a remote end and an inner end and an outer tube with an integral toothed coaxial socket wrench;

a rack and pinion arrangement on said inner end of said capture shaft;

a coupling actuator for adjusting said rack and pinion arrangement from said remote end;

a mounted fixed seal including threads thereon on the isolated system;

a threaded fastener slidable on said outer tube of said tubular insertion and coupling tool, said threaded fastener including a toothed end for engagement by said toothed coaxial socket wrench and a threaded end;

a thrust bearing and a gasket disposed between said threaded fastener and said mounted fixed seal; and said thrust bearing having a lower thermal contraction rate than said threaded fastener and said mounted fixed seal;

whereby securing said threaded fastener to said mounted fixed seal creates a vacuum or pressure tight seal between said threaded end of said threaded fastener and said threads of said mounted fixed seal and confines said thrust bearing and said gasket between said threaded fastener and said mounted fixed seal.

2. The remote sealing apparatus of claim 1 including a sealing surface is provided on each side of said gasket;

said threaded fastener and said mounted fixed seal are constructed of a first metal having a characteristic thermal contraction rate; and said thrust bearing is constructed of a metal having a lower thermal contraction rate than said first metal enabling said thrust bearing to contract at a lower rate than said threaded fastener and said mounted fixed seal and thereby increase the pressure of said gasket against said sealing surfaces as said isolated system cools.

3. The remote sealing apparatus of claim 2 wherein said first metal is stainless steel and said thrust bearing is constructed of titanium.

4. The remote sealing apparatus of claim 1 wherein said rack and pinion arrangement includes a pinion gear integral with said capture shaft at said inner end of said tubular insertion and coupling tool;

two coupling pins parallel to one another, said coupling pins including outer ends and a rack gear on the inner sides of said coupling pins, said rack gear of said coupling pins in engagement with said pinion gear;

said coupling actuator capable of adjusting said coupling pins between a retracted position and an extended position.

5. The remote sealing apparatus of claim 1 wherein the material of construction of said gasket is selected from the group including polymers including biaxially-oriented polyethylene terephthalate, polyimide, copper, aluminum, and indium.

6. The remote sealing apparatus of claim 1 wherein said threads on said mounted fixed seal are external threads; and said threaded fastener including internal threads.

7. A method of creating a seal around a tubular target in an isolated system including the steps of providing an elongated tubular insertion and coupling tool including a remote end and an inner end, an inner capture shaft, an outer tube slidable with respect to said inner capture shaft, a toothed coaxial socket wrench integral with said outer tube and having teeth thereon;

providing a rack and pinion arrangement including two coupling pins on said inner end of said capture shaft;

providing a mounted fixed seal on said isolated system, said mounted fixed seal including a central bore, threads and a first sealing surface;

providing a threaded fastener including threads, a toothed end, and a second sealing surface;

providing a tubular target stick including an inner end, and an outer end with bores therein;

providing a coupling actuator on said tubular insertion and coupling tool for actuating said coupling pins from said remote end;

providing a thrust bearing and a gasket on said target stick;

actuating said rack and pinion arrangement from said remote end until said coupling pins are retracted;

placing said insertion and coupling tool together end to end in axial alignment and contact with said target stick such that said coupling pins of said insertion and coupling tool are in alignment with said bores of said target stick;

actuating said rack and pinion arrangement from said remote end until said coupling pins of said insertion and coupling tool are extended through said bores in said target stick to lock said insertion and coupling tool to said target stick;

inserting said inner end of said target stick into said central bore in said cold nut, said thrust bearing and said gasket remaining on said outer end of said target stick;

placing said threaded fastener on said mounted fixed seal with said threads of said threaded fastener engaging said threads of said mounted fixed seal;

advancing said toothed coaxial socket wrench until said teeth engage said toothed end of said threaded fastener;

turning said toothed coaxial socket wrench clockwise to fasten said threaded fastener to said mounted fixed seal;

applying a measured amount of torque to crush said gasket between said first sealing surface of said mounted fixed seal and said second sealing surface of said threaded fastener to create a vacuum-tight or pressure-tight seal; and actuating said rack and pinion arrangement from said remote end until said coupling pins are retracted and said insertion and coupling tool is released from said target stick.

8. The remote sealing apparatus of claim 7 wherein said threaded fastener and said mounted fixed seal are constructed of a first metal having a characteristic thermal contraction rate; and said thrust bearing is constructed of a metal having a lower thermal contraction rate than said first metal enabling said thrust bearing to contract at a lower rate than said threaded fastener and said mounted fixed seal and thereby increase the pressure of said gasket against said sealing surfaces as said isolated system cools.

9. The remote sealing apparatus of claim 8 wherein said first metal is stainless steel and said thrust bearing is constructed of titanium.

10. The remote sealing apparatus of claim 7 wherein said rack and pinion arrangement includes a pinion gear integral with said capture shaft at said inner end of said tubular insertion and coupling tool;

said coupling pins are parallel to one another;

said coupling pins include outer ends, inner sides, and a rack gear on said inner sides of said coupling pins;

said rack gear of said coupling pins in engagement with said pinion gear; and said coupling actuator capable of adjusting said coupling pins between a retracted position and an extended position.

11. The remote sealing apparatus of claim 7 wherein the material of construction of said gasket is selected from the group including polymers including biaxially-oriented polyethylene terephthalate, polyimide, copper, aluminum, and indium.

12. The remote sealing apparatus of claim 11 wherein said threads on said mounted fixed seal are external threads; and said threaded fastener including internal threads.

* * * * *